H. E. CUNNINGHAM.
Card-Clothing.
No. 213,876.　　　　　Patented April 1, 1879.
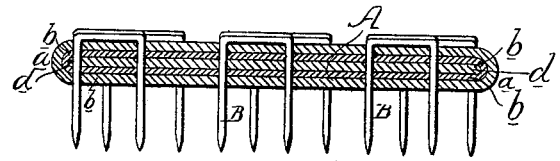
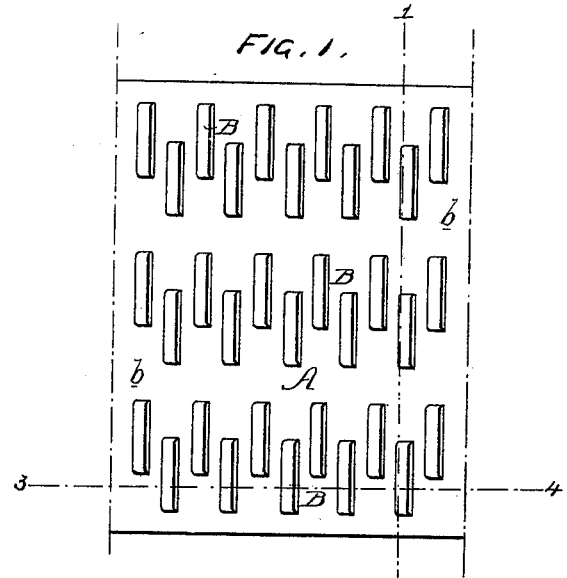
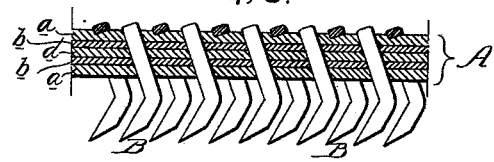
Witnesses
Inventor
Herman E. Cunningham
by his Attorneys
Howson & Son

UNITED STATES PATENT OFFICE.

HERMAN E. CUNNINGHAM, OF PHILADELPHIA, PENNSYLVANIA, ASSIGNOR TO HIMSELF, THOMAS CUNNINGHAM, LUCIEN BROWN, H. B. LINCOLN, GEORGE BROWN, AND FRANK P. PENDLETON, OF SAME PLACE.

IMPROVEMENT IN CARD-CLOTHING.

Specification forming part of Letters Patent No. 213,876, dated April 1, 1879; application filed January 29, 1879.

*To all whom it may concern:*

Be it known that I, HERMAN E. CUNNINGHAM, of Philadelphia, Pennsylvania, have invented a new and useful Improvement in Card-Clothing, of which the following is a specification:

The main object of my invention is to make card-clothing which can be used for operating on wet stock without being injured thereby; and this object I attain in the following manner, reference being had to the accompanying drawings, in which—

Figure 1 is a top view of a strip of my improved card-clothing; Fig. 2, a transverse section on the line 1 2; Fig. 3, a section on the line 3 4, and Fig. 4 a perspective view of one of the teeth.

The foundation or backing A of the card-clothing consists of a composite band, made partly of rubber and partly of canvas or other suitable fabric. In the present instance the band is composed of an inner layer, $d$, of rubber, and on each side of the latter a layer, $b$, of canvas, the whole being contained in a cover, $a$, of rubber. The several layers are thoroughly united by means of the usual rubber-solvents—naphtha, for instance—and the whole made into a compact band in the manner adopted in the manufacture of rubber belting, the teeth B being inserted in the ordinary way.

Whatever may be the number or character of the inner layers of rubber and canvas in the backing, it is essential to my invention that the outer covering should be of rubber, and that this rubber should extend not only over both sides of the backing, but over both edges, so that there can be no possibility of the access of moisture to the fabric in the interior.

Moisture cannot penetrate through the outer cover of rubber at the points where the teeth are inserted, for the rubber clings too closely to the shanks of the teeth both above and below to permit this.

Fibrous stock of different kinds can be best carded while in a moist condition, and this moisture has a deteriorating effect on leather and other kinds of backing.

I am aware that the foundation or backing of card-clothing has been composed partly of fabric and partly of rubber. This, therefore, I do not claim, broadly. Nor do I claim the coating the opposite sides of the clothing with rubber; but

I claim as my invention—

Card-clothing in which teeth are combined with a backing composed partly of rubber and partly of fabric, the outer cover of rubber extending over both sides and over the edges of the backing, all as set forth.

In testimony whereof I have signed my name to this specification in the presence of two subscribing witnesses.

HERMAN E. CUNNINGHAM.

Witnesses:
WILLIAM J. COOPER,
HENRY HOWSON, Jr.